US008985562B2

United States Patent
Chen

(10) Patent No.: US 8,985,562 B2
(45) Date of Patent: Mar. 24, 2015

(54) DIAMETER-VARIABLE CYLINDRICAL AIR PRESSURE SPRING

(75) Inventor: Ayu Chen, Zhejiang (CN)

(73) Assignee: Xilinmen Furniture Co., Ltd., Yuecheng Shaoxing (CN)

( * ) Notice: Subject to any disclaimer, the term of this patent is extended or adjusted under 35 U.S.C. 154(b) by 63 days.

(21) Appl. No.: 13/980,293

(22) PCT Filed: Apr. 23, 2012

(86) PCT No.: PCT/CN2012/074507
§ 371 (c)(1),
(2), (4) Date: Jul. 17, 2013

(87) PCT Pub. No.: WO2013/123711
PCT Pub. Date: Aug. 29, 2013

(65) Prior Publication Data
US 2014/0145382 A1 May 29, 2014

(30) Foreign Application Priority Data

Feb. 21, 2012 (CN) .......................... 2012 1 0039496

(51) Int. Cl.
*F16F 9/04* (2006.01)
(52) U.S. Cl.
CPC ............. *F16F 9/0409* (2013.01); *F16F 9/0418* (2013.01)
USPC ..................................... 267/64.28; 267/64.11
(58) Field of Classification Search
CPC ........... F16F 1/37; F16F 1/377; F16F 1/3873; F16F 9/0409; F16F 9/0418
USPC ........ 267/35, 85, 64.11, 64.28, 118, 151–153
See application file for complete search history.

(56) References Cited

U.S. PATENT DOCUMENTS

| | | | | |
|---|---|---|---|---|
| 3,690,540 A | * | 9/1972 | Hardigg | 206/521 |
| 4,120,061 A | | 10/1978 | Clark | |
| 4,399,974 A | * | 8/1983 | Takei | 248/605 |
| 5,054,753 A | * | 10/1991 | Polus | 267/153 |
| 5,092,567 A | * | 3/1992 | Wang | 267/141 |
| 5,953,778 A | | 9/1999 | Hiatt | |

FOREIGN PATENT DOCUMENTS

| CN | 101422305 A | 5/2009 |
|---|---|---|
| CN | 100506117 C | 7/2009 |
| CN | 202418390 U | 9/2012 |

* cited by examiner

*Primary Examiner* — Anna Momper
(74) *Attorney, Agent, or Firm* — Tianhua Gu; Global IP Services

(57) ABSTRACT

The invention relates to a diameter-variable cylindrical air pressure spring. The current air pressure spring has the shortcomings of complex structure, insufficient deformation stroke and poor ventilation effect. The diameter-variable cylindrical air pressure spring comprises a spring body, the spring body is formed by at least one hollow cavity body, the sidewall of the cavity body is of a multilayered structure, a closed cavity containing pressure air is formed between every two layers of the sidewall, the cavity body is in a diameter-variable cylindrical shape with two thicker ends and a thinner middle part, and a vent hole is arranged on each cavity, the spring is hollow and therefore good in top-to-bottom air penetrability, the inflation amount of the cavity is adjusted in real-time by means of inflation or deflation via the vent hole in order to adjust the hardness (elasticity) of the air pressure spring and to enhance the comfortable level and applicable scope; after the pressure air in the cavities is eliminated and the diameter-variable cylindrical air pressure spring is compressed, the spring takes up a small space and can be coiled to facilitate package, storage and transportation; and cavity columns may be independent, or may be formed in rows or in lines, and the cavities of the cavity columns may be either independent of or communicated with each other.

8 Claims, 3 Drawing Sheets

DIAMETER-VARIABLE CYLINDRICAL AIR PRESSURE SPRING

TECHNICAL FIELD

The invention relates to the technical field of spring manufacturing, in particular to a diameter-variable air pressure spring.

BACKGROUND

In terms of functionality, 'springs' can be classified in three categories including compression spring, torsion spring and tension spring, and common compression spring is formed by spirally coiling metal wires with strong elasticity, such as steel wires, and generates elasticity by means of their elastic deformation. Such a compression spring is fixed and nonadjustable in elasticity after being formed and still takes up a large space after being compressed, and satisfactory comfortable level cannot be imparted to all the application areas when it is used for spring mattress and the like. Gas spring has been designed, but it consists of a cylinder, a piston (push rod), an additional built-in spring and other parts, which leads to complex structure and high requirement on inter-part fitting, and in particular, pistons are arranged respectively on the upper and lower ends of a flexible cylindrical body and a hollow cavity is formed therebetween to bring about spring effect, however, there is a defect of top-to-bottom air impenetrability, therefore, when it is used for mattress compression spring, moisture generated by human body or moisture in the environment will gather and cannot be removed through air convection, negative influence on body health is inevitable in the event that people sleeps on the air spring mattress filled with moisture; furthermore, the gas spring above is insufficient in deformation stroke, small in hardness adjustment range, complex in the production process for parts and high in cost, and stills takes up a large space when not used.

SUMMARY OF THE INVENTION

The objective of the invention is to solve the shortcomings in the prior art discussed above and accordingly provides a diameter-variable cylindrical air pressure spring, which is adjustable in elasticity, good in ventilation, long in deformation stroke and small in space after being compressed.

The invention is implemented in such a manner that: the diameter-variable cylindrical air pressure spring comprises a spring body, the spring body is formed by at least one hollow cavity body, the sidewall of the cavity body is of a multilayered structure, a closed cavity containing pressure air is formed between every two layers of the sidewall, the cavity body is in a diameter-variable cylindrical shape with two thicker ends and a thinner middle part, and a vent hole is arranged on each cavity. In this proposal, the air pressure spring is hollow and therefore good in top-to-bottom air penetrability, and is low in possibility of moisture deposition so as to avoid the negative influence of gathered moisture on human body health and the product itself when the air pressure spring is used for cushion, seat and other articles; the inflation amount of the cavity is adjusted in real-time by means of inflation or deflation via the vent hole in order to adjust the hardness (elasticity) of the air pressure spring and to enhance the comfortable level and applicable scope; the sidewall of the air pressure spring is of a multilayered structure, one cavity is formed when there are two layers of the sidewall, double parallel cavities are formed when there are three layers of the sidewall, and the specific quantity can be set based upon the load bearing condition; the cavity body in the middle of the air pressure spring is in a diameter-variable cylindrical shape with two thicker ends and a thinner middle part, and presents a concave drum shape as seen from its vertical section, besides, the sidewall presents smooth planes with radian under inflation, in this case, the diameter-variable cylindrical air pressure spring in which the deformation stroke of the cavity body is changed by a concave drum-shaped structure is different from the current gas spring in which deformation is generated only by the flexible change of the material itself, so the diameter-variable cylindrical air pressure spring has the advantages of large deformation and wide hardness adjustment range; when the air pressure spring is under a pressure from above, the pressure can be uniformly dispersed on the air pressure spring by this structure, thus avoiding excessive bending damage due to too much local pressure caused by long-time uneven stress and further prolonging the service life effectively; after the pressure air in the cavities is eliminated and the air pressure spring is compressed, the spring takes up a small space and can be coiled to facilitate package, storage and transportation. The cavity columns may be independent, or may be formed in rows or in lines, and the cavities of the cavity columns may be either independent of or communicated with each other.

Preferably, a plurality of air holes transversely penetrating through the cavity are arranged on the sidewall of the cavity body. In this proposal, a transverse air convection channel of the air pressure spring is provided to further improve its ventilation effect, and the design of the air holes and the hollow cavity body overcomes the problems resulted from closeness of the air pressure spring, and imparts the air pressure spring with the advantages of steel compression spring.

Preferably, shaping rings capable of restoring deformation are lined at the upper and lower cavity mouths of the cavity body, and a reinforcing ring parallel to the shaping rings is lined at the small-diameter position of the inner sidewall of the cavity body. In this proposal, the shaping ring may also be made of steel wire, copper wire, plastic ring or other hard elastic materials, preferably steel wire, this is because it has good deformation resistance so as to be liable to restore after extrusion by an external force, and it also has good support property; in addition, stress is effectively evenly applied to the sides of the small-diameter section of the cavity body by arranging the reinforcing ring, therefore, uneven stress damage caused by single-side pressure bias is prevented and the compressive strength of the air pressure spring is improved.

Preferably, the vent hole is arranged on the sidewall of the cavity body and is provided with an air valve. In this proposal, the vent hole is arranged on the sidewall to facilitate connection with air pipe and air valve, which helps every air pressure spring to control the air pressure strength and avoids affecting the comfortable level in use.

Preferably, at least one layer of the sidewall of the cavity body is formed by a macromolecular organic material or by laminating the macromolecular organic material and a fiber fabric, and laminating the macromolecular organic material and the fiber fabric means filling of the macromolecular organic material in the pores of the fiber fabric or covering of the macromolecular organic material at one side of the fiber fabric. In this proposal, the macromolecular organic material includes rubber, TPU and/or nylon, the effect of sealing pressure air can be achieved by adopting macromolecular materials like rubber, besides, leak repair can be implemented via a leak repair agent in order to improve softness and sealing property; the fiber fabric plays a role of shaping, so that the air pressure spring is free from excessive extended deformation subsequent to filling of pressure air, and sufficient strength is imparted to cavity wall.

Preferably, the cavity body has a height of 4-20 cm and a diameter of 4-8.5 cm. In this proposal, if the cavity body is too high, deformation stroke of the cavity body will be too long, leading to instability, and if the cavity body is too low, the comfortable level will be reduced due to relatively high hardness; if the diameter is too large, surface materials laid on the cavity body will be partially immersed due to lack of support so as to create a pit, and if the diameter is too small, the bottom surface is narrowed and the cavity body is unstable and accordingly liable to swing under pressure.

Preferably, the spring body is externally covered by a soft ventilating outer cover. In this proposal, the outer cover may be a bag made of fiber fabric and can be deformed along with the deformation of the spring body, thus facilitating connection between the adjacent air pressure springs and preventing adhesion and interference between the adjacent sidewalls.

Preferably, hollow positioning plates are lined at the upper and lower cavity mouths of the cavity body. In this proposal, the pressure resistance of the air pressure spring is enhanced by arranging the positioning plates, and such a plate-like structure is favorable for improving the stability of the air pressure spring in the vertical direction.

The invention has the essential characteristics below: adjustability for the hardness of the cavity body is implemented in a manner of filling pressure air in the multilayered sidewall of the hollow cavity body, in particular, the diameter-variable cylindrical air pressure spring is large in deformation stroke and good in transverse and longitudinal ventilation, thus overcoming not only the defects of great corrosion possibility and nonadjustable elasticity in metal spring, but also the defects of complex structure and poor ventilation in piston (push rod) type gas spring, furthermore, the structure of the cavity body is changed into a concave drum shape with inner arc wall, so the air pressure spring is evenly stressed to obtain superior compressive strength. The diameter-variable cylindrical air pressure spring is used for manufacturing soft mattress, sofa, massage chair, cushion and the like, and is easy for removing moisture so that the influence on human health is eliminated; the spring is convenient in hardness adjustment and wide in one-way deformation range, meets various demands and can be adjusted in real time to enhance the comfortable level; in addition, the diameter-variable cylindrical air pressure spring is convenient for coiled package to save the transportation cost, and can be unfolded by inflation when used by a user.

Figure 1:
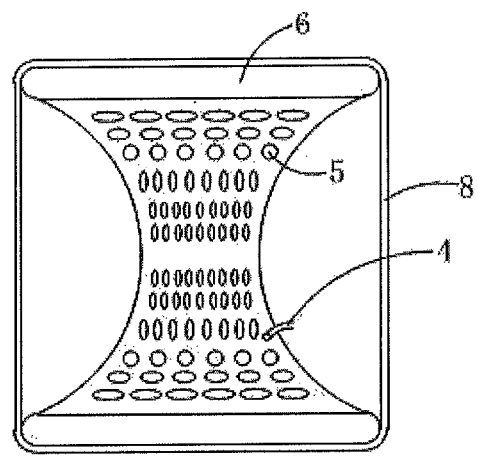
FIG. 1 is a structure diagram of the invention.

In the drawings: 1-spring body, 2-cavity body, 3-cavity, 4-vent hole, 5-air hole, 6-shaping ring, 7-reinforcing ring, and 8-outer cover.

DETAILED DESCRIPTION OF THE EMBODIMENTS

Further description is made below to the essential characteristics of the invention with reference to the drawings of description and the embodiments.

Figure 2:
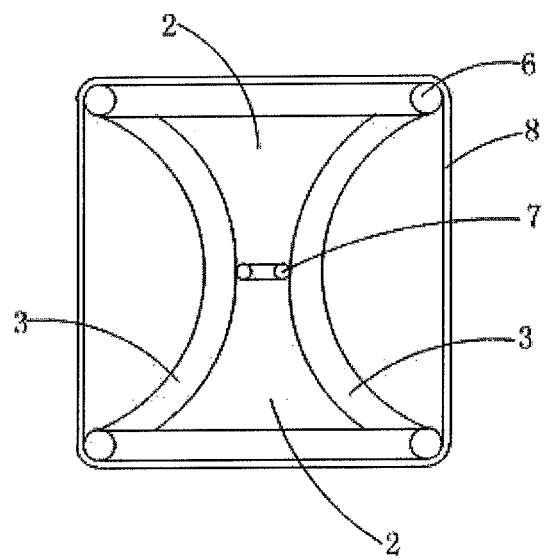
FIG. 2 is a sectional view of FIG. 1.
Figure 3:
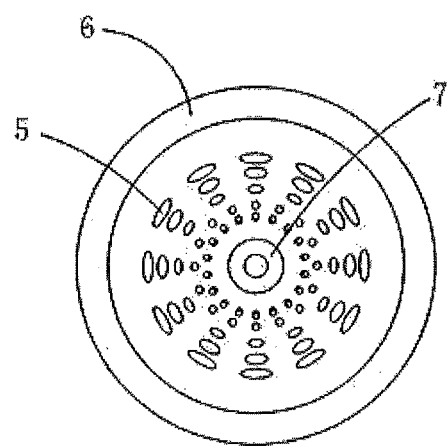
FIG. 3 is a top view of FIG. 1.
Figure 5:
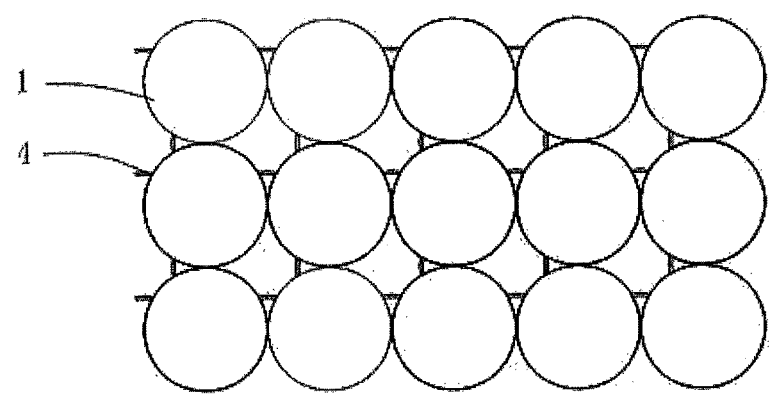
FIG. 5 is a structure diagram of the invention connected by multiple planes.

Embodiment 1 as shown in FIG. 1 and FIG. 2, a diameter-variable cylindrical air pressure spring comprises a spring body 1, the spring body 1 is formed by at least one hollow cavity body 2, the sidewall of the cavity body 2 is of a multilayered structure, a closed cavity 3 containing pressure air is formed between every two layers of the sidewall, the cavity body 2 is in a diameter-variable cylindrical shape with two thicker ends and a thinner middle part, and a vent hole 4 is arranged on each cavity 3; a plurality of air holes 5 transversely penetrating through the cavity 3 are arranged on the sidewall of the cavity body 2 (as shown in FIG. 3); the air holes 5 close to the two ends of the cavity body 2 are transverse waist-shaped holes, and the air holes 5 in each row are arrayed towards the middle part of the cavity body 2 and are therefore gradually changed into vertical waist-shaped holes; shaping rings 6 capable of restoring deformation are lined at the upper and lower cavity mouths of the cavity body 2, and a reinforcing ring 7 parallel to the shaping rings 6 is lined at the small-diameter position of the inner sidewall of the cavity body 2; at least one layer of the sidewall of the cavity body (2) is formed by a macromolecular organic material or by laminating the macromolecular organic material and a fabric, and laminating the macromolecular organic material and the fiber fabric means filling of the macromolecular organic material in the pores of the fabric or covering of the macromolecular organic material at one side of the fiber fabric; the cavity body 2 has a height of 4-20 cm and a diameter of 4-8.5 cm; the vent hole is arranged on the sidewall of the cavity body 2 and is provided with an air valve, and the vent hole 4 can be connected with an air pump component via an air pipe in order to adjust the hardness of the air pressure spring in real-time by inflation or deflation; there may be one or two vent holes 4, and the specific quantity is determined based upon the design requirement in air pressure adjustment; the spring body 1 is preferably externally covered by a soft ventilating outer cover 8, the outer cover 8 is a cloth bag or a knitted fabric made of other material and can be deformed along with the deformation of the spring body 1; when the air pressure spring is used for manufacturing soft mattress, sofa, massage chair, cushion and other articles, the outer cover plays a role of fixing the air pressure spring in order to prevent it from displacement and swing under pressure (as shown in FIG. 5).

In a specific operation, the air holes 5 are waist-shaped holes, the air holes 5 close to the two ends of the cavity body 2 are in a transverse waist shape, the air holes 5 in each row are arrayed towards the middle part of the cavity body 2 and are therefore gradually changed into vertical waist-shaped holes, transverse air holes 5 with larger width are arranged at the two ends of the cavity body 2 to contribute to moisture dispersion at the two ends of the air pressure spring, and good compressive strength of the air pressure spring can be ensured because of large diameters at the two ends of the cavity body 2; the cavity body 2 has a thinner middle part that is provided with the vertical air holes 5 with smaller width, thus not only providing a moisture dispersion passage, but also bringing more effective air containing area on the section of the cavity 3 to ensure the compressive strength of the air pressure spring.

Figure 4:
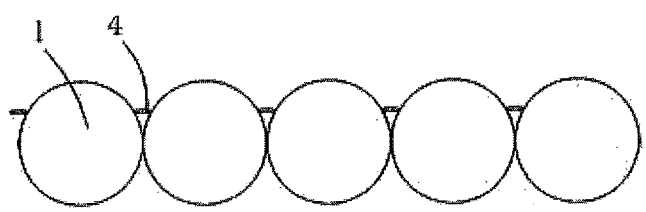
FIG. 4 is a structure diagram of the invention connected in a row.

The air pressure spring can also be arranged in any shape by means of mutual connection of the plurality of spring bodies 1 (as shown in FIG. 4), and the cavities 3 of the cavity bodies 2 can be either independent of or communicated with each other.

Embodiment 2 this embodiment is different from the aforementioned embodiment 1 in that there are three layers of the sidewall of the cavity body 2 so as to form superposed cavities 3 at double layers; in practical use, the inflation amount of each cavity 3 can be adjusted independently to increase the extent of elasticity adjustment. For example: when the spring is not used, the two cavities 3 are not inflated; when a relatively small elasticity is needed, one of the cavities 3 can be inflated independently; and when a relatively large elasticity is needed, the two cavities 3 are inflated at the same time. And the inflation amount of each cavity 3 can be adjusted in light of practical conditions to realize a considerable stepless adjustment for elasticity.

If any one layer of the sidewall is damaged and accordingly air leakage occurs, the remaining two layers of the sidewall can still be reserved or combined to form an independent cavity 3, thus prolonging the service life of the invention.

Figure 6:
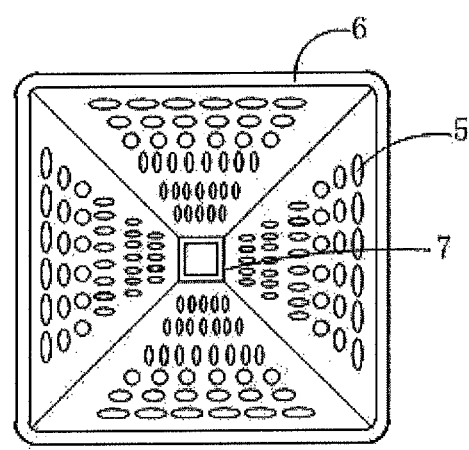
FIG. 6 is a top view of the invention with a polygonal (quadrangular) section.

Embodiment 3 this embodiment is different from the aforementioned embodiments 1 and 2 in that the cross section of the cavity body 2 can be changed into a polygonal section in light of service condition, the shaping rings 6 at the upper and lower two sides of the cavity body 2 and the reinforcing ring 7 in the middle are correspondingly polygonal when the section of the cavity body 2 is polygonal (as shown in FIG. 6), however, the vertical section of the cavity body 2 is still in a concave drum shape with smooth arc surfaces, in order to ensure compressive strength.

Embodiment 4 this embodiment is different from the aforementioned embodiments 1, 2 and 3 in that the shaping rings 6, which can be lined at the upper and lower cavity mouths of the cavity body 2, can be replaced by hollow positioning plates in light of practical conditions, in order to obtain good vertical stability. Alternatively, the invention can also be used after the shaping rings 6 are disassembled for the purposes of convenient processing and elasticity adjustment. Alternatively, the shaping rings 6 can also be replaced by imperforate positioning plates in the invention, in order to obtain good structural strength.

Embodiment 5 this embodiment is different from the aforementioned embodiments 1, 2, 3 and 4 in that the shape of the air hole 5 is not limited to the instance described in the embodiment 1, and the air holes 5 may be in a different shape and arranged in a different way to achieve the same ventilation effect as the aforementioned preferred embodiments.

Embodiment 6 this embodiment is different from the aforementioned embodiments 1, 2, 3, 4 and 5 in that the invention can be used after the ventilating outer cover 8 is disassembled, so under individual use or other specific conditions, elasticity adjustment and convenient processing are both achieved to save raw materials.

Discussed above is merely the preferred embodiments of the invention that are not intended to limit the invention. There may be a variety of modifications and variations made to the invention in the embodiments discussed above. Any modifications, equivalent substitutions and improvements made within the spirit and principle of the invention shall fall within the scope of the invention.

The invention claimed is:

1. A diameter-variable cylindrical air pressure spring, comprising a spring body, characterized in that, the spring body is formed by at least one hollow cavity body, the sidewall of the cavity body is of a multilayered structure, a closed cavity containing pressure air is formed between every two layers of the sidewall, the cavity body is in a diameter-variable cylindrical shape with two thicker ends and a thinner middle part, and a vent hole is arranged on each cavity.

2. The diameter-variable cylindrical air pressure spring according to claim 1, wherein a plurality of air holes transversely penetrating through the cavity are arranged on the sidewall of the cavity body.

3. The diameter-variable cylindrical air pressure spring according to claim 1, wherein shaping rings capable of restoring deformation are lined at the upper and lower cavity mouths of the cavity body, and a reinforcing ring parallel to the shaping rings is lined at the small-diameter position of the inner sidewall of the cavity body.

4. The diameter-variable cylindrical air pressure spring according to claim 1, wherein the vent hole is arranged on the sidewall of the cavity body and is provided with an air valve.

5. The diameter-variable cylindrical air pressure spring according to claim 1, wherein at least one layer of the sidewall of the cavity body is formed by a macromolecular organic material or by laminating the macromolecular organic material and a fiber fabric, and laminating the macromolecular organic material and the fiber fabric means filling of the macromolecular organic material in the pores of the fiber fabric or covering of the macromolecular organic material at one side of the fiber fabric.

6. The diameter-variable cylindrical air pressure spring according to claim 1, wherein the cavity body has a height of 4-20 cm and a diameter of 4-8.5 cm.

7. The diameter-variable cylindrical air pressure spring according to claim 1, wherein the spring body is externally covered by a soft ventilating outer cover.

8. The diameter-variable cylindrical air pressure spring according to claim 1, wherein hollow positioning plates are lined at the upper and lower cavity mouths of the cavity body.

* * * * *